Dec. 21, 1965  E. L. KOCHEY, JR  3,225,340
SELF-COMPENSATING LOW VELOCITY TRIP OR ALARM DEVICE
Filed Sept. 26, 1961  2 Sheets-Sheet 1

INVENTOR.
EDWARD L. KOCHEY JR
BY
ATTORNEY

Dec. 21, 1965  E. L. KOCHEY, JR  3,225,340
SELF-COMPENSATING LOW VELOCITY TRIP OR ALARM DEVICE
Filed Sept. 26, 1961  2 Sheets-Sheet 2

INVENTOR.
EDWARD L. KOCHEY JR.
BY
R. F. Bryant
ATTORNEY

United States Patent Office 3,225,340
Patented Dec. 21, 1965

3,225,340
SELF-COMPENSATING LOW VELOCITY TRIP
OR ALARM DEVICE
Edward L. Kochey, Jr., Colebrook, Conn., assignor to
Combustion Engineering, Inc., Windsor, Conn., a corporation of Delaware
Filed Sept. 26, 1961, Ser. No. 140,850
8 Claims. (Cl. 340—239)

My invention relates to velocity measuring apparatus, and more particularly to apparatus for accurately sensing a predetermined velocity of a fluid regardless of temperature or density changes of such fluid.

In many systems it is desirable to accurately measure the flow velocity through the system regardless of temperature or density variations in the system fluid. Density changes in the fluid generally are not compensated for by most velocity measuring equipment, and thus the instruments are not accurate when the fluid density varies. In boilers, where the temperature of the fluid in the system can vary greatly, for example from 80° F. on up to over 700° F., it is desirable in many instances to have an accurate indication of minimum flow velocities through various portions of the boiler, regardless of temperature and thus density conditions. Some devices used today for measuring flow velocity where there is greatly varying densities of the fluid measured, incorporate a thermometer along with a standard pressure differential measuring device; or various electrical velocity measuring devices having built-in temperature compensating features are also used. These devices are usually quite complex and costly to construct and maintain. They are based on a determination of density by means external to the pressure sensing device and then applying a compensation to the sensed pressure differential.

It is the object of this invention to provide a simple apparatus for measuring and indicating when a predetermined minimum flow velocity through a pipe line is reached, regardless of the temperature or density of the fluid flowing; such apparatus utilizing a restriction in the flow line and pressure taps positioned across such restriction.

The invention comprises an arrangement, construction and combination of the elements of the inventive organization in such a manner as to attain the results desired as hereinafter more particularly set forth in the description of the illustrative embodiments, said embodiments being shown by the accompanying drawings wherein.

Figure 1:
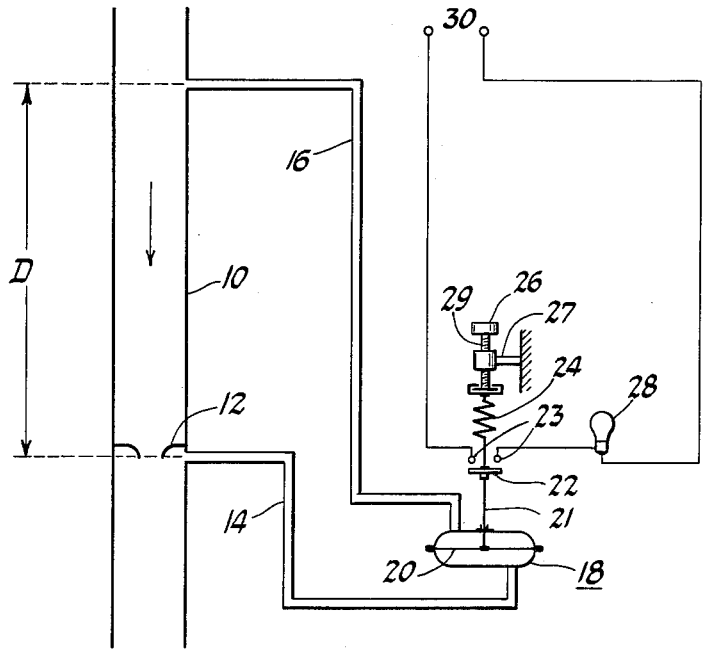
FIGURE 1 is a cross-sectional view of a velocity measuring device in accordance with my invention.

Looking now to FIGURE 1 of the drawings, 10 designates a pipe line through which a fluid is flowing having widely varying temperature, and thus density, characteristics. Flow nozzle 12 is positioned within pipe 10 and creates a pressure differential which varies as the square of the velocity of the fluid flowing therethrough. Pressure tap 14 is positioned directly beneath and downstream of restriction 12, and measures the static pressure in this low pressure region. Pressure tap 16 is located above and on the upstream side of the restriction 12, and due to the restriction the static pressure measured upstream thereof is generally higher than that measured by pressure tap 14. The static pressures taken at the upstream and downstream sides of restriction 12 by means of taps 16 and 14 respectively, are compared or balanced against each other in pressure differential measuring device 18.

The two pressures act on opposite sides of diaphragm 20, and rod 21 which is secured to the diaphragm 20 moves in accordance with pressure changes. Switch 22 is secured to rod or stem 21, and is positioned such that it completes a circuit through contacts 23 when certain pressure differential conditions exist. The switch 22 can be initially adjusted or positioned by means of handle 26 on screw threaded member 29, which coacts with fixed screw threaded member 27. By turning the handle 26, the spring 24 can be placed either under slight tension or compression. When contacts 23 are bridged by switch 22 a circuit is completed from a source of power (not shown) connected through terminals 30 to the indicating light 28.

Pressure taps across a restriction can be used to measure velocity of fluid passing through a pipe line, the velocity being measured indirectly by measuring the pressure differential across a restriction, which differential is proportional to the square of the fluid velocity. This pressure differential also varies directly with the density of the fluid, the density changing with changes in temperature.

A head, or differential pressure of the fluid measured by taking pressure readings at two vertically spaced points in a pipe varies in the same manner as will the pressure differential measured across a restriction with respect to variations in density. Hence, if two pressure taps are correctly positioned vertically across a restriction, when the differential pressure between the pressure taps is zero, it is an indication of a predetermined velocity, regardless of the density of the fluid, since the pressure differential caused by the restriction is equal to the pressure differential caused by the vertical head, or vertical spacing of the taps, and temperature or density changes affect each of these differentials equally. An increase in temperature, and thus a corresponding decrease in density, decreases the pressure differential measured between the two vertically spaced points, and also decreases the pressure differential measured across a restriction an equal amount, when these two differentials are the same.

At any velocity other than the predetermined one, a deviation in pressure differential might be an indication of either (1) a change in velocity or (2) a change in temperature and thus density. A higher velocity will always change the differential in the same direction, but the amount of deviation will vary with density. Thus a false reading cannot be obtained by an odd combination of flow and density.

It is well known that the differential pressure head measured across a restriction varies as the square of the velocity. Or $h = K'Q^2$ where $h$ is the pressure differential between two taps across a restriction, in feet of cold water, caused by the restriction; $K'$ is a constant; and $Q$ is the velocity in cubic feet per second. It is also well known that the pressure differential head $h$ measured in p.s.i. or feet of cold water is directly proportional to the density of the fluid.

As an example, assuming the cross-sectional area of a pipe to be 1 sq. foot; $K'$ is .2; and the desired minimum velocity corresponds to a Q of 3 cubic feet per second. Then $h = .2(3)^2 = .2(9) = 1.8$ feet of cold water. This would be the pressure differential created by the restriction in the pipe line when the flow velocity is 3 f.p.s. In order to get an accurate indication of a minimum flow velocity on a pressure differential measuring device, such as 18 in FIGURE 1, the upper pressure tap 16 must be located a vertical distance D of 1.8 feet above the lower pressure tap 14. The pressure differential across taps 14 and 16 due to the vertical head of water would thus be equal to the pressure differential measured by the same two taps 14 and 16, which pressure differential is created by the restriction 12 at the predetermined velocity of 3 f.p.s. This zero pressure differential at the pressure taps will be reflected in a reading on device 18 of 1.8 feet of cold water, this being the imbalance in elevation of the two taps. Since the meter leads are always maintained at ambient temperature and will not change density the device 18 will always sense 1.8 feet of cold water when the differential pressure between the taps is zero. This reading on device 18 will remain regardless of temperature change and thus density change, since the head $h$, which is the pressure differential between the two taps across the restriction, will vary directly as the density of the fluid. Thus, if the temperature of the water flowing through pipe 10 increased from 80° F. to 680° F., and the density thus became half of what it was at 80° F., the head $h$ would be .9 of a foot. The pressure differential due to the vertical spacing D would also be ½(1.8) or .9, and a zero differential would occur between the taps and a 1.8 feet of cold water reading on the pressure differential measuring device 18 would still be registered.

This would be true only when D is 1.8 feet and the velocity is 3 f.p.s. Otherwise, a change in reading on the pressure differential measuring device 18 might be caused by either (1) a change in velocity or (2) a change in temperature and thus density.

For example, assume that D remains 1.8 feet, and the flow is 4 c.f.s. corresponding to a velocity of 4 f.p.s. Then $h=.2(4)^2=.2(16)=3.2$ feet. The differential caused by the vertical spacing D is 1.8 feet. The pressure differential between taps 14 and 16 thus would be 3.2−1.8, or 1.4 feet of cold water rather than zero. Device 18 would then read 1.8+1.4 or 3.2 feet of cold water. Now if the temperature of the water increases from 80° F. to 680° F., thus reducing the density to one-half of what it was originally, then the differential would still be 1.4 feet of the fluid flowing but only 0.7 feet of cold water. This differential is still above the zero differential which would indicate a 3 f.p.s flow. The pressure differential measuring device 18 would now indicate 1.8+0.7 or 2.5 feet of cold water, and an individual reading the device would not know the cause of the change from 3.2 to 2.5. This change from 3.2 to 2.5 could also be caused solely by a change in velocity, with no change in density. Any velocity below 3 f.p.s. would result in readings on device 18 of less than 1.8 feet of cold water.

It is to be understood that the figures used are merely for illustrative purposes and not true calculations. For example, the constant K′ might actually be something other than .2, as herein used. Depending on the size of the pipe line and the distance D, the friction loss of the fluid flowing through the pipe line should be considered in the calculations used to determine the vertical distance D, if it is significant.

Thus it can be seen from FIGURE 1 that when a predetermined velocity flow of fluid through pipe line 10 is reached, a predetermined differential is measured by device 18, in the example cited this predetermined differential being 1.8 feet of cold water, and at this time switch 22 bridges contacts 23, thus energizing indicating light 28. This will be true regardless of the temperature or density of the fluid.

Figure 2:
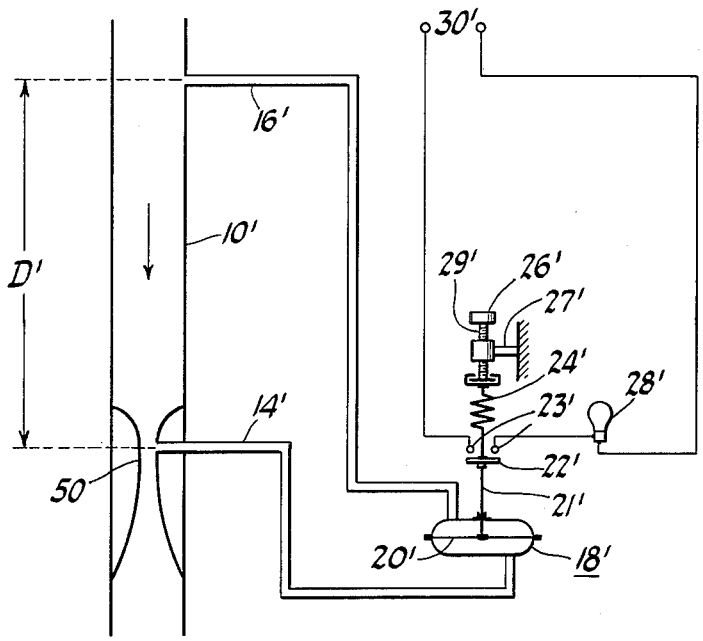
FIGURE 2 shows a second embodiment of a velocity measuring device in accordance with my invention.

FIGURE 2 illustrates the use of my invention utilizing a restriction in the form of a venturi 50 rather than a flow nozzle as in FIGURE 1. The rest of the structure is identical to that shown in FIGURE 1, and the same numerals have been used to designate these parts, with a prime (′) added thereto.

Figure 3:
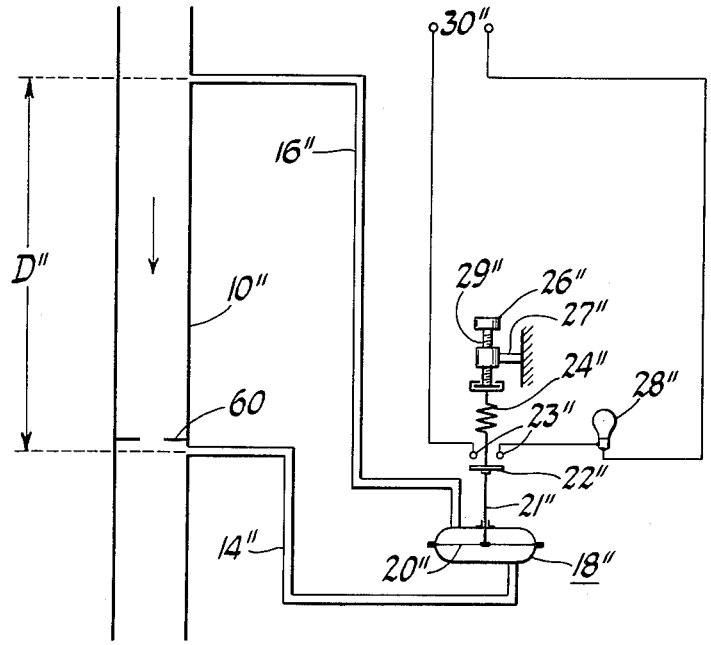
FIGURE 3 shows a third embodiment of a velocity measuring device in accordance with my invention.

In FIGURE 3 my invention is shown in conjunction with a restriction 60 in the form of an orifice, the rest of the elements being designated by the same numerals used in FIGURE 1 with a double prime (″) added thereto.

Figure 4:
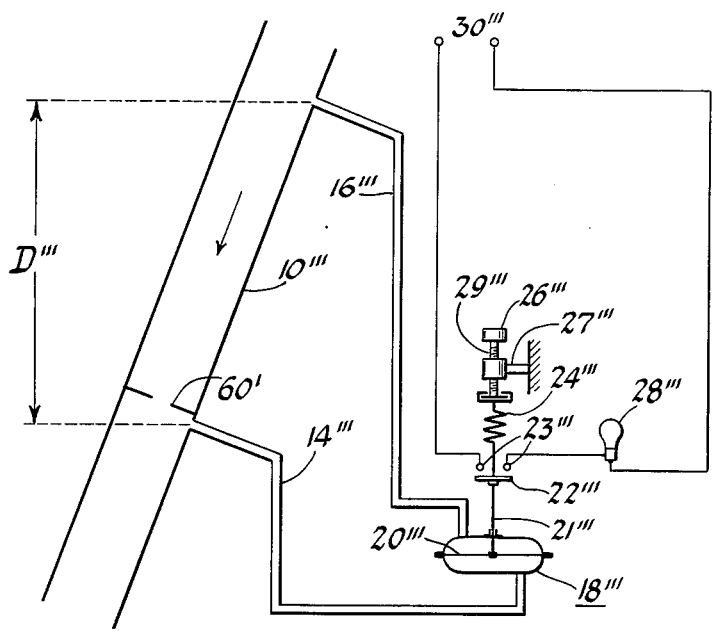
FIGURE 4 is similar to FIGURE 3, showing my device being utilized on a pipe line that is not directly vertical.

FIGURE 4 shows apparatus constructed in accordance with my invention for measuring a predetermined minimum flow velocity through a pipe line which is not position directly vertical, but is at an angle to the vertical. It is not a necessity in order to make use of my invention that the pipe line be directly vertical, or even that the pipe line be a straight piece of pipe. The only requirement is that the vertical distance D between the two pressure taps, whatever it is determined to be, be present. If there are bends in the pipe, the losses due to the flow through such bends should be figured in the calculations, if they are significant. The FIGURE 2, 3, and 4 embodiments act in the same manner as the FIGURE 1 apparatus to energize the light when a predetermined minimum velocity is reached.

While my invention has been described and illustrated as actuating an indicating means 28, it is obvious that it could be utilized as a control means also. For example when a predetermined minimum velocity is reached switch 22 could complete a circuit which would shut off a pump or close a valve in the pipe line 10, or the fuel supply to a boiler furnace could be shut off. My invention could also be used for measuring a predetermined maximum velocity. This could be accomplished by placing switch 22 on rod 21 above contacts 23, and thus when the flow velocity in the pipe line reached the predetermined maximum, and thereabove, switch 22 would bridge contacts 23. It could also be used to sense a predetermined velocity for alarm purposes, this velocity being considered neither maximum nor minimum.

While I have illustrated and described the preferred embodiments of my invention, it is to be understood that such is merely illustrative and not restrictive and that variations may be made therein without departing from the spirit and scope of the invention. I therefore do not wish to be limited to the precise details set forth but desire to avail myself of such changes as fall within the purview of my invention.

What I claim is:

1. A velocity measuring device, a vertical pipe through which a fluid is flowing, a restriction in said pipe for developing a difference in pressure in said fluid having a definite relation to the velocity of the fluid, a first pressure tap below and on the downstream side of the restriction, a second pressure tap above and on the upstream side of said restriction, the vertical distance between said first and second pressure taps being such that when the fluid flowing through the pipe is at a predetermined velocity, the pressure differential between said first and second taps is zero, regardless of the temperature or density of the fluid flowing, pressure responsive means connected to the first and second pressure taps for comparing the pressure existing at said first and second pressure taps, and normally de-energized indicating means connected to the pressure responsive means, said indicating means being connected to the pressure responsive means in such a manner that it is energized when the pressure existing at said first and second pressure taps are equal.

2. A velocity measuring device comprising a vertical pipe through which a fluid is flowing, a restriction in said pipe for developing a difference in pressure in said fluid having a definite relation to the velocity of the fluid, a first pressure tap below and on the downstream side of said restriction, a second pressure tap above and on the upstream side of said restriction, means for comparing the pressures existing at said first and second pressure taps, said second pressure tap being positioned a vertical distance above said first pressure tap such that when the fluid flowing through said pipe is at a predetermined velocity, the pressure differential between said first and second taps is zero, regardless of the temperature or density of the fluid, switch means connected to the means for comparing the pressures, said switch means having an open position and a closed position, the switch means being connected to the means for comparing the pressures in such a manner that when the pressures existing at said first and second pressure taps are equal, the switch means is moved from one position to its other position.

3. The velocity measuring device of claim 2, said restriction being an orifice.

4. The velocity measuring device of claim 2, said restriction being a venturi.

5. The velocity measuring device of claim 2, said restriction being a flow nozzle.

6. A velocity measuring device comprising a pipe through which a fluid is flowing, a first portion of said pipe being at a higher elevation than a second portion, a restriction in said pipe for developing a difference in pressure in said fluid having a definite relation to the rate of flow of the fluid, said restriction located in said second portion of the pipe, a first pressure tap connected to the pipe at the location of the restriction, a second pressure tap connected to the pipe in said first portion of the pipe, the vertical distance between the first and second pressure tap connections being such that when the fluid is flowing at a predetermined velocity, the pressure existing at the first and second pressure taps are equal, regardless of the temperature or density of the fluid flowing, pressure responsive means connected to the first and second pressure taps for comparing the pressure existing at said first and second pressure taps, and normally de-energized electrical means connected to the pressure responsive means, said electrical means being connected to the pressure responsive means in such a manner that it is energized when the pressures existing at said first and second pressure taps are equal.

7. A velocity measuring device comprising a pipe through which a fluid is flowing, a first portion of said pipe being at a higher elevation than a second portion, a restriction in said pipe, said restriction located in said second portion of the pipe, a first pressure tap connected to the pipe at the location of the restriction, a second pressure tap connected to the pipe in said first portion of the pipe, the vertical distance between the first and second pressure tap connections being such that when the fluid is flowing at a predetermined velocity, the pressures existing at the first and second pressure taps are equal, regardless of the temperature or density of the fluid flowing, pressure responsive means connected to the first and second pressure taps for comparing the pressures existing at said first and second pressure taps, switch means connected to the pressure responsive means, said switch means having an open position and a closed position, the switch means being connected to the pressure responsive means in such a manner that when the pressures existing at said first and second pressure taps are equal, the switch means is moved from one position to its other position.

8. A velocity measuring device for indicating when a predetermined minimum fluid flow velocity exists in a pipe, comprising a pipe through which a fluid is flowing, a first portion of said pipe being at a higher elevation than a second portion, a restriction in said pipe, said restriction located in said second portion of the pipe, a first pressure tap connected to the pipe at the location of the restriction, a second pressure tap connected to the pipe in said first portion of the pipe, the vertical distance between the first and second pressure tap connections being such that when the fluid is flowing at a predetermined velocity, the pressure existing at the first and second pressure taps are equal, regardless of the temperature or density of the fluid flowing, pressure responsive means connected to the first and second pressure taps for comparing the pressures existing at said first and second pressure taps, normally open switch means connected to the pressure responsive means, said switch means being connected to the pressure responsive means in such a manner that when the pressures existing at said first and second pressure taps are equal, the switch means is closed.

References Cited by the Examiner

UNITED STATES PATENTS

| | | | |
|---|---|---|---|
| 1,638,101 | 8/1927 | Roucka | 73—205 |
| 1,638,102 | 8/1927 | Roucka | 73—205 |
| 1,977,498 | 10/1934 | Staegemann | 200—81.6 |
| 2,012,351 | 8/1935 | Riney et al. | 200—81.6 |
| 2,439,723 | 4/1948 | Engdahl | 73—196 |
| 2,468,768 | 5/1949 | Malick | 340—236 |
| 2,497,029 | 2/1950 | Korte et al. | 340—236 |
| 2,698,929 | 1/1955 | Greacen et al. | 340—239 |
| 2,803,963 | 8/1957 | Condolios | 73—205 XR |
| 2,809,248 | 10/1957 | Frakes | 340—239 XR |
| 2,949,123 | 8/1960 | Lawrence | 73—196 XR |
| 2,986,151 | 5/1961 | Shannon | 73—205 XR |

FOREIGN PATENTS

| | | |
|---|---|---|
| 1,173,998 | 3/1959 | France. |
| 840,675 | 7/1960 | Great Britain. |

NEIL C. READ, *Primary Examiner.*

ROBERT H. ROSE, *Examiner.*